(12) United States Patent
Sprenger et al.

(10) Patent No.: US 8,591,981 B2
(45) Date of Patent: Nov. 26, 2013

(54) OLIGOSACCHARIDE MIXTURE

(75) Inventors: Norbert Sprenger, Savigny (CH); Francois Morgan, Rennes (FR); Rafael Berrocal, Saint-Legier (CH); Marcel Braun, Konolfingen (CH)

(73) Assignee: Nestec S.A., Vevey (CH)

( * ) Notice: Subject to any disclaimer, the term of this patent is extended or adjusted under 35 U.S.C. 154(b) by 920 days.

(21) Appl. No.: 11/816,516

(22) PCT Filed: Feb. 21, 2006

(86) PCT No.: PCT/EP2006/060130
§ 371 (c)(1),
(2), (4) Date: Sep. 18, 2008

(87) PCT Pub. No.: WO2006/087391
PCT Pub. Date: Aug. 24, 2006

(65) Prior Publication Data
US 2009/0035813 A1    Feb. 5, 2009

(30) Foreign Application Priority Data
Feb. 21, 2005  (EP) .................................... 05075420

(51) Int. Cl.
*A23C 9/00*    (2006.01)

(52) U.S. Cl.
USPC .............. 426/588; 426/34; 426/580; 426/658

(58) Field of Classification Search
USPC .............. 426/34, 42, 43, 580, 587, 588, 658, 426/800, 801
See application file for complete search history.

(56) References Cited

U.S. PATENT DOCUMENTS

| 4,957,860 | A | * | 9/1990 | Kan et al. .................... 435/101 |
| 5,270,462 | A | | 12/1993 | Shimatani |
| 5,792,501 | A | | 8/1998 | Lepine |
| 5,882,714 | A | | 3/1999 | Lepine |
| 6,288,222 | B1 | | 9/2001 | Roth et al. |
| 2003/0129278 | A1 | | 7/2003 | Stahl et al. |
| 2004/0131659 | A1 | | 7/2004 | Gibson et al. |

FOREIGN PATENT DOCUMENTS

| EP | 0 458 358 | 11/1991 |
| EP | 1352967 | 10/2003 |
| JP | 58-190388 | 7/1983 |
| JP | 03-216185 | 9/1991 |
| WO | 02/07529 | 1/2002 |
| WO | 2006087391 | 8/2006 |

\* cited by examiner

*Primary Examiner* — Leslie Wong
(74) *Attorney, Agent, or Firm* — K&L Gates LLP

(57) ABSTRACT

An oligosaccharide mixture derived from animal milk, food products comprising said oligosaccharide mixture and a process for producing said oligosaccharide mixture.

18 Claims, No Drawings

OLIGOSACCHARIDE MIXTURE

FIELD OF THE INVENTION

This invention relates to an oligosaccharide mixture derived from animal milk, food products comprising said oligosaccharide mixture and a process for producing said oligosaccharide mixture.

BACKGROUND OF THE INVENTION

The human large intestine is colonised with a wide range of bacteria that have both positive and negative effects on gut physiology as well as having other systemic influences. Predominant groups of bacteria found in the colon include bacteroides, bifidobacteria, eubacteria, clostridia and lactobacilli. The bacteria present have fluctuating activities in response to substrate availability, redox potential, pH, $O_2$ tension and distribution in the colon. In general intestinal bacteria can be divided into species that exert either potentially harmful or beneficial effects on the host. Pathogenic effects (which may be caused by clostridia or bacteroides, for example) include diarrhoea, infections, liver damage, carcinogenesis and intestinal putrefaction. Health-promoting effects may be caused by the inhibition of growth of harmful bacteria, stimulation of immune functions, improving digestion and absorption of essential nutrients and synthesis of vitamins. An increase in numbers and activities of bacterial groups (such as bifidobacteria and lactobacilli) that may have health promoting properties is desirable.

As far as infants specifically are concerned, immediately before birth, the gastrointestinal tract of a baby is thought to be sterile. During the process of birth, it encounters bacteria from the digestive tract and skin of the mother and starts to become colonised. Large differences exist with respect to the composition of the gut microbiota in response to the infant's feeding. The decal flora of breast-fed infants includes appreciable populations of bifidobacteria with some *Lactobacillus* species, whereas formula-fed infants have more complex microbiota, with bifidobacteria, bacteroides, clostridia and streptococci all usually present. After weaning, a pattern of gut microbiota that resembles the adult pattern becomes established.

Mother's milk is recommended for all infants. However, in some cases breast feeding is inadequate or unsuccessful for medical reasons or the mother chooses not to breast feed. Infant formulas have been developed for these situations.

One approach to promote the numbers and/or activities of beneficial bacteria in the colon is the addition of prebiotics to foodstuffs. A prebiotic is a non-digestible food ingredient that beneficially affects the host by selectively stimulating the growth and/or activity of one or a limited number of bacteria in the colon, and thus improves host health. Such ingredients are non-digestible in the sense that they are not broken down and absorbed in the stomach or small intestine and thus pass intact to the colon where they are selectively fermented by the beneficial bacteria. Examples of prebiotics include certain oligosaccharides, such as fructooligosaccharides (FOS) and galactooligosaccharides (GOS).

Human milk is known to contain a larger amount of indigestible oligosaccharides than most other animal milks. In fact, indigestible oligosaccharides represent the third largest solid component (after lactose and lipids) in breast milk, occurring at a concentration of 12-15 g/l in colostrum and 5-8 g/l in mature milk. Human milk oligosaccharides are very resistant to enrymatic hydrolysis, indicating that these oligosaccharides may display essential functions not directly related to their calorific value.

As the composition of human milk becomes better understood, it has also been proposed to add prebiotics to infant formula. Various infant formulas supplemented with prebiotics such as mixtures of fructooligosaccharides and galactooligosaccharides for example are commercially available. However, such mixtures approximate only roughly the mixture of oligosaccharides in human milk. Over 100 different oligosaccharide components have been detected in human milk some of which have not been so far detected in animal milks such as bovine milk at all or have been detected only in small quantities. Examples of classes of human milk oligosaccharide that are present in bovine milk and colostrum only in very small quantities or not at all are sialylated and fucosylated oligosaccharides.

U.S. Patent Application No. 2003/0129278 describes an oligosaccharide mixture based on oligosaccharides produced from one or several animal milks which is characterized in that it comprises at least two oligosaccharide fractions which are each composed of at least two different oligosaccharides, with free lactose not pertaining thereto. The total spectrum of the oligosaccharides present in the oligosaccharide mixture differs from those present in the animal milk or animal milks from which the oligosaccharide fractions were extracted. Further a) if said oligosaccharides are extracted from only one animal milk the proportion of neutral oligosaccharides to acidic (sialylated) oligosaccharides is 90-60: 10-40 weight %, or b) if said oligosaccharides are extracted from at least two animal milks, the oligosaccharides extracted from two different animal milks each make up 10 weight % of the total amount of oligosaccharides present in the oligosaccharide mixture.

U.S. Pat. No. 5,270,462 describes a process for recovering, from cheese whey or rennet whey, sialic acid-bound oligosaccharides, sialic acid-bound peptides and sialic acid-bound lipids at a high concentration, comprising the steps of adjusting cheese whey or rennet whey to a pH of 2-5; contacting the whey with a cation exchanger to produce an exchanger-passed solution; and concentrating and/or desalting said exchanger-passed solution. The resulting composition with a high content of sialic acids can be utilized as food materials or medical materials.

EP 0 458 358 relates to a process for producing skim milk powder containing 10-15% by weight of galacto-oligosaccharide, which comprises:

(i) concentrating skim milk to obtain concentrated milk with a solid content of 20-50% by weight, (ii) adding β-galactosidase to the concentrated milk to give rise to an enzymatic reaction, (iii) heating the resulting reaction mixture for 30 seconds to 15 minutes to a temperature of 70-85° C. in order to terminate the enzymatic reaction, and (iv) spray-drying the reaction-terminated mixture.

An object of the invention is to provide an oligosaccharide mixture which is effective as a prebiotic, particularly in the human gut and which has an oligosaccharide profile closer to that of human milk than that provided by mixtures of fructo- and galacto-oligosaccharides.

SUMMARY OF THE INVENTION

In one aspect the invention relates to an oligosaccharide mixture derived from animal milk wherein the mixture has a lactose:oligosaccharide ratio of less than 250 and contains the same spectrum of oligosaccharides as the milk from which it was derived. This ingredient is a new protective and immunomodulating ingredient that is structurally closer to human breast milk oligosaccharides, for example in that there is a higher proportion of sialylated oligosaccharides, as compared to available prebiotic ingredients, such as fructo-oligosaccharides and galacto-oligosaccharides. A low lactose: oligosaccharide ratio has the advantage that the oligosaccharide mixture can be added to infant formula and other food products without also introducing unnaturally high amounts of lactose. For example, 0.5 to 50 g of oligosaccharide mixture may be added per litre of formula. Preferably, the mixture has a lactose:oligosaccharide ratio of from 125 to 1.25.

Preferably the oligosaccharide mixture is derived from one or more of cows' milk, goats' milk or buffalo milk, although milk from other animals, such as sheep, camels, horses and elephants may be used.

Optionally the oligosaccharide mixture further comprises β-galacto-oligosaccharides (β-GOS). Human milk contains significantly more neutral oligosaccharides than other animal milks, such as cows' milk, and accordingly it is desirable to increase the content of GOS in the oligosaccharide mixture of the invention to produce a mixture which has an oligosaccharide profile closer to that of human milk. The ratio of oligosaccharides:β-galacto-oligosaccharides in the mixture of the present invention may be in the range from 0.01 to 99. Preferably the OS:GOS ratio is between 1:2 and 1:20 with a particularly preferred ratio being between 1:2 and 1:6.

In another aspect the invention relates to a food product comprising an oligosaccharide mixture as described above. Optionally the food product is an infant food or formula, but the product may be any food or drink consumed by babies, infants or adults. Consumption of a food product containing an oligosaccharide mixture as a prebiotic will selectively promote the growth and/or activity of one or a limited number of bacteria in the colon, and thus improve host health.

In a further aspect the invention provides a process for producing an oligosaccharide mixture derived from animal milk and having the same spectrum of oligosaccharides as the milk from which it was derived comprising the steps of (a) concentrating a deproteinised milk material to 50 to 75% total solids, (b) subjecting the concentrated milk material to a lactose removal step to produce a liquor having a lactose: oligosaccharide ratio of less than 250 and (c) demineralising the milk material, the demineralisation step being carried out either before the concentration step or after the lactose removal step.

Preferably step (b) of the process comprises a lactose crystallisation step followed by a concentration step to remove lactose crystals and produce the liquor having a lactose:oligosaccharide ratio of less than 250.

Alternatively the lactose removal step may comprise spray-drying the concentrated material produced in step (a) and then adding water to dissolve the oligosaccharides whilst leaving the lactose in a crystallised form.

Optionally, the lactose crystallisation and removal step may be repeated (in the case where some lactose has already been removed by crystallisation) or added (in the case where differential solubility has been employed) in order to further concentrate the liquor and eliminate lactose.

Preferably, the demineralisation step is carried out after the lactose removal step(s).

Preferably the deproteinised milk material is an ultrafiltration permeate of milk or whey. However, any deproteinised milk material may be used such as acid whey or sweet whey (both by-products of cheese making) in each case after removal of the whey proteins.

Optionally, the process further comprises treatment with β-galactosidase to produce β-galacto-oligosaccharides. The β-galactosidase used may be of any microbial, plant or animal origin provided that it exhibits substantial trans-galactosidic activity. Preferably, the β-galactosidase used is derived from *Aspergillus oryzae*. This enzymatic treatment may take place before concentration of the deproteinised milk material or after completion of the lactose removal steps or both as desired but preferably takes place after completion of the lactose removal steps.

After the lactose removal step(s), the liquor product may be treated with individual proteases and/or combinations thereof to degrade any remaining milk proteins and peptides into entities with reduced molecular mass. This is particularly preferred if the oligosaccharide mixture is to be incorporated in hypoallergenic infant formulas, which are intended for infants at risk of developing cows' milk allergy, and which accordingly contain only proteins which are partially hydrolysed.

The resulting liquor product may be used in liquid form but preferably is spray-dried to give a powder.

DETAILED DESCRIPTION OF THE INVENTION

The invention provides an oligosaccharide mixture derived from animal milk wherein the mixture has a lactose:oligosaccharide ratio of less than 250 and contains the same spectrum of oligosaccharides as the milk from which it was derived and a process for its production. This mixture may be incorporated in infant or adult food products and confers prebiotic, immune modulating and protective effects.

Oligosaccharides are herein defined as those found naturally in animal milks and having a degree of polymerisation (DP) ranging from 3 to 20 inclusive.

The oligosaccharide mixture of the invention also contains lactose (DP=2), and has a lactose:oligosaccharide ratio of less than 250, preferably between 125 and 1.25. This corresponds to a 2 to 200 times decreased lactose content in the oligosaccharide mixture as compared to the original animal milk; which is equivalent to a 2 to 200 times increased ratio between oligosaccharides and lactose.

The oligosaccharide mixture of the invention is derived from one or more animal milks. The milk may be obtained from any kind of animal, in particular from cows, goats, buffalos, horses, elephants, camels or sheep.

The starting material in the process for producing the oligosaccharide mixture is a deproteinised milk material such as milk from which the proteins have been removed or whey or any prepared or modified whey material from which the whey proteins have been removed. Such materials include acid whey and sweet whey. Preferred starting materials are milk ultrafiltration permeate and whey ultrafiltration permeate. Alternatively the starting material may be a reconstituted powder, such as a powdered ultrafiltration permeate.

The starting material should be a deproteinised product since the presence of proteins during concentration can lead to undesirable Maillard reactions and browning. The starting material can be deproteinised by any known means, for example acid precipitation, heat processes, ion exchange. Preferably, however, removal of protein is effected by ultrafiltration, which also removes lipids from the starting material.

The starting material can also be demineralised by any known means, for example reverse osmosis, nanofiltration or ion exchange. Alternatively, the demineralisation step can be carried out after the lactose removal step(s) again using any known means.

The pH of the starting material may be between 3 and 7.5 although a pH in the range from 5 to 6 is preferred to prevent oligosaccharide hydrolysis e.g. desialylation of sialyllactose and help reduce browning reactions.

The deproteinized milk material is concentrated to 50 to 75% total solids (TS), preferably 55 to 60% TS, by any known means provided that the temperature does not increase to a level which would hydrolyse or desialylate the oligosaccharides. Concentration is preferably carried out at temperatures of 50 to 90° C., more preferably 50 to 75° C. Evaporation is one preferred technique, which is carried out at a pressure from 80 to 200 mbar. In this method the temperature does not rise above 60° C. which ensures that the oligosaccharides are not affected Alternatively if the starting material is a powder, concentration to the desired level may be achieved by appropriate reconstitution of the powder.

The process optionally comprises a further step of treating the deproteinised milk material with β-galactosidase to produce a milk material comprising β-galacto-oligosaccharides (GOS). Accordingly, the milk material may be treated with β-galactosidase before concentration of the milk material (step (a)) and/or after the lactose removal step(s) (step (b)) but preferably takes place after completion of the lactose removal step(s). β-galactosidase catalyses the breakdown of lactose to the monosaccharides galactose and glucose and the subsequent formation of galacto-oligosaccharides. Preferably the β-galactosidase used is derived from *Aspergillus oryzae*. Such an enzyme is commercially available as Lactase F from Amano, Japan. The enzyme activity measured according to the FCCIV method may be between 1000 and 30000 U/kg of lactose. The enzymatic treatment may be carried out at a pH in the range from 3 to 8, at a temperature between 4 and 70 IC on a starting material with a lactose concentration between 5 and 70 g/100 g TS at an enzyme concentration between 1.5-10 g per kg of oligosaccharide mixture. Preferably about 5 g enzyme is used per kg of oligosaccharide mixture and incubation is for between 1 and 24 hours at 40-70° C. The enzyme may be inactivated after use by application of heat.

Preferably, the lactose removal step is effected by crystallisation of the lactose. Lactose crystallisation may be effected in the concentrated starting material by cooling the concentrated material with or without addition of a seed crystal, for example. Lactose crystals are then removed by any known method, for example centrifugation, filtration, decantation.

An alternative method to separate lactose from the oligosaccharides makes use of differential solubilities. The starting material is spray-dried and then water is added to dissolve the oligosaccharides whilst leaving the lactose in a crystallised form.

The resulting liquor is highly enriched in oligosaccharides, the ratio of oligosaccharides:lactose being 2 to 200 times higher as compared to the ratio found in the milk from which the liquor is derived.

The liquor can be re-concentrated as described above and a further lactose removal step may be carried out. This process may be repeated as often as desired.

When the desired amount of lactose has been removed, the liquor may be treated with individual proteases and/or combinations thereof to degrade any remaining milk proteins and peptides into entities with reduced molecular mass. Such a step may be desirable if the mixture is intended for incorporation in a hypoallergenic infant formula.

The liquor is preferably also treated with β-galactosidase to form β-galacto-oligosaccharides as described above. This results in a second proposed ingredient for food products which comprises milk oligosaccharides as defined above and GOS with a DP of from 3 to 10.

After treatment with 1 to 6 mg of β-galactosidase per g TS of a liquor with total solids concentration of 50% and about 35% lactose, the resulting solution may contain about 2-4% oligosaccharides, about 2-15% GOS, about 15-30% lactose, about 5-10% galactose and about 2-14% glucose. The ratio of oligosaccharides:β-GOS may range from 0.01 to 99 but lies in the range from 1.2 to 1:20, more preferably 1:2 and 1:6.

The resulting liquor can be used in liquid form or can be dried (e.g. by spray-drying) to give a powder. The resulting powder contains approximately 50% lactose and the remainder is a mixture of oligosaccharides (about 1 to 20%, including sialylated oligosaccharides), monosaccharides such as glucose and galactose, about 10% non-protein nitrogen containing compounds, 2% residual proteins and some residual salts.

In a preferred aspect of the invention, the oligosaccharide mixtures described above are incorporated into a food product. In the context of the present invention, the term "food product" is intended to encompass any consumable matter. Hence, it may be a product intended for consumption by humans, in particular infant formula, dehydrated milk powders including growing-up milks or cereal mixtures.

The infant formula may be prepared in any suitable manner. For example, an infant formula may be prepared by blending together the protein source, any carbohydrates other than lactose and the fat source in appropriate proportions. Emulsifiers may be added if desired. Vitamins and minerals may be added at this point but are usually added later to avoid thermal degradation. Any lipophilic vitamins, emulsifiers and the like may be dissolved into the fat source prior to blending. Water, preferably water which has been subjected to reverse osmosis, may then be mixed in to form a liquid mixture.

The liquid mixture may then be thermally treated to reduce bacterial loads. For example, the liquid mixture may be rapidly heated to a temperature in the range of about 80° C. to about 110° C. for about 5 seconds to about 5 minutes. This may be carried out by steam injection or by heat exchanger, e.g. a plate heat exchanger.

The liquid mixture may then be cooled to about 60° C. to about 85° C., for example by flash cooling. The liquid mixture may then be homogenised, for example in two stages at about 7 MPa to about 40 MPa in the first stage and about 2 MPa to about 14 MPa in the second stage. The homogenised mixture may then be further cooled to add any heat sensitive components such as vitamins and minerals. The pH and solids content of the homogenised mixture is conveniently standardised at this point.

The homogenised mixture is transferred to a suitable drying apparatus, such as a spray drier or freeze drier, and converted to powder. The powder should have a moisture content of less than about 5% by weight.

The oligosaccharide mixture of the invention may be added to the infant formula or other food product by wet mixing at an appropriate stage in the manufacturing process or by dry mixing but is preferably added by wet mixing immediately before spray-drying, for example in the standardisation tank. However, it will be apparent to the person skilled in the art that the amount of carbohydrate in the infant formula will need to be adjusted to take into account the additional carbohydrate that will be provided by the oligosaccharide mixture. The final concentration of the oligosaccharide mixture in the baby or infant food product or formula is preferably between 2 and 50 g/l for example 32.5 g/l of the formula as consumed. However, these amounts should not be considered as limitative and should be adapted to the target population, for example based on the weight and age or health of the baby or infant. Preferably, the formula containing the oligosaccharide mixture of the invention is fed to the baby at every feed.

Alternatively, the oligosaccharide mixtures may be added to infant or adult food products by dry mixing. The mixture may be added to baby or infant formula at concentrations of from about 5 to 40 grams of oligosaccharides per 100 g of dry formula without bringing unnaturally high amounts of lactose into the formula. However, these amounts should not be considered as limitative and should be adapted to the target population, for example based on the weight and age of the baby or infant, or the health of the specific population.

Although it is preferred to supplement food products specifically targeted towards infant or baby nutrition, it may be beneficial to supplement food products not specifically targeted, or targeted to the adult population. For example, the oligosaccharide mixtures of the invention can be incorporated into healthcare nutrition products and nutritional products for the elderly. Such food products may include milk, yoghurt, curd, cheese, fermented milks, milk-based fermented products, ice-creams, fermented cereal based products, or milk-based products, among others.

The invention will now be further described by reference to the following examples.

Example 1

One process of preparing an oligosaccharide mixture according to the invention is described below.

200,000 litres of a whey ultrafiltration permeate are pre-concentrated to 22% (w/w) total solids (TS), pasteurised at about 75° C. for about 30 seconds and then concentrated by evaporation at 60° C. to reach a TS of 59% (w/w). The liquid is cooled in a crystalliser at a rate of 2° C. per hour for a period of 24 hours to crystallise the lactose. Crystallised lactose is washed then removed by a wringer The remaining liquid is clarified through a decanter. The 77000 litres at 17.7% TS obtained from the clarifier are re-concentrated by evaporation at 60° C. to reach a TS of 55% (w/w) and subject to a second lactose crystallisation step under the same conditions as before. The 29000 litres at 20.5% TS of liquor thereby obtained are demineralised by a combination of electrodialysis and ion exchange in a manner known per se yielding 28500 litres of a 90% demineralised liquor at 17.3% TS. This liquor, which contains approximately 2 grams of animal milk oligosaccharides per long TS and 70 grams of lactose per 100 g TS, may either be added directly to a food product such as an infant formula by addition to the wet phase or may be dried, for example by spray drying and added to a food product such as an infant formula by dry mixing.

Example 2

100 kg of oligosaccharide mixture produced according to Example 1 at 50% TS are heated to 60° C. in a standard tank and the pH is adjusted to 6 to 6.5. The concentrations of lactose, glucose, galactose, galactooligosaccharides and other oligosaccharides in the mixture are measured. 4.5 mg of Lactase F (Amano, Japan) are added per gram of TS and the mixture is held at 60° C. for three hours. Then the temperature is raised to 110° C. for 11 seconds by direct steam injection to inactivate the enzyme. The concentrations of lactose, glucose, galactose, galactooligosaccharides and other oligosaccharides in the mixture are re-measured and the results are shown below.

| (% dry matter) | Lactose | Glucose | Galactose | OS | GOS |
|---|---|---|---|---|---|
| at time 0 | 70 | 3 | 5 | 2 | 0.7 |
| after 3 hours | 29 | 12 | 11 | 2 | 10 |

Example 3

An example of the composition of an infant formula containing an oligosaccharide mixture according to the present invention is given below.

| Nutrient | per 100 kcal | per litre |
|---|---|---|
| Energy (kcal) | 100 | 670 |
| Protein (g) | 1.83 | 12.3 |
| Fat (g) | 5.3 | 35.7 |
| Linoleic acid (g) | 0.79 | 5.3 |
| α-Linolenic acid (mg) | 101 | 675 |
| Lactose (g) | 11.2 | 74.7 |
| OS mixture (from Example 1) (g) | 1.49 | 1.0 |
| GOS (from Example 2) (g) | 0.746 | 5.0 |
| Minerals (g) | 0.37 | 2.5 |
| Na (mg) | 23 | 150 |
| K (mg) | 89 | 590 |
| Cl (mg) | 64 | 430 |
| Ca (mg) | 62 | 410 |
| P (mg) | 31 | 210 |
| Mg (mg) | 7 | 50 |
| Mn (μg) | 8 | 50 |
| Se (μg) | 2 | 13 |
| Vitamin A (μg RE) | 105 | 700 |
| Vitamin D (μg) | 1.5 | 10 |
| Vitamin E (mg TE) | 0.8 | 5.4 |
| Vitamin K1 (μg) | 8 | 54 |
| Vitamin C (mg) | 10 | 67 |
| Vitamin B1 (mg) | 0.07 | 0.47 |
| Vitamin B2 (mg) | 0.15 | 1.0 |
| Niacin (mg) | 1 | 6.7 |
| Vitamin B6 (mg) | 0.075 | 0.50 |
| Folic acid (μg) | 9 | 60 |
| Pantothenic acid (mg) | 0.45 | 3 |
| Vitamin B12 (μg) | 0.3 | 2 |
| Biotin (μg) | 2.2 | 15 |
| Choline (mg) | 10 | 67 |
| Fe (mg) | 1.2 | 8 |
| I (μg) | 15 | 100 |
| Cu (mg) | 0.06 | 0.4 |
| Zn (mg) | 0.75 | 5 |

The invention claimed is:

1. An oligosaccharide mixture derived from animal milk, the mixture comprising a lactose:oligosaccharide ratio of less than 250 and containing a spectrum of oligosaccharides that is the same as a spectrum of oligosaccharides of milk from which it was derived, wherein the mixture further comprises an oligosaccharide:β-galacto-oligosaccharide ratio ranging between 1:2 and 1:20.

2. The oligosaccharide mixture as claimed in claim 1 wherein the mixture has a lactose:oligosaccharide ratio of from 125 to 1.25.

3. The oligosaccharide mixture as claimed in claim 1 which is derived from a milk selected from the group consisting of cows' milk, goats' milk and buffalo milk.

4. The oligosaccharide mixture as claimed in claim 1 comprising β-galacto-oligosaccharides.

5. A food product comprising an oligosaccharide mixture derived from animal milk, the mixture comprising a lactose:oligosaccharide ratio of less than 250 and containing a spectrum of oligosaccharides that is the same as a spectrum of oligosaccharides of milk from which it was derived, wherein the mixture further comprises an oligosaccharide:β-galacto-oligosaccharide ratio ranging between 1:2 and 1:20.

6. The food product as claimed in claim 5 which is an infant food or formula.

7. A process for producing an oligosaccharide mixture, the process comprising:
(a) concentrating a deproteinised milk material to 50 to 75% total solids;
(b) subjecting the concentrated milk material to a lactose removal step to produce a liquor having a lactose:oligosaccharide ratio of less than 250; and
(c) demineralising the milk material to produce the oligosaccharide mixture derived from animal milk and having the same spectrum of oligosaccharides as the milk from which it was derived.

8. The process as claimed in claim 7 wherein step (b) comprises a lactose crystallisation step and a concentration step to remove lactose crystals and produce a liquor having a lactose:oligosaccharide ratio of less than 250.

9. The process as claimed in claim 7 wherein step (b) comprises spray-drying the deproteinised milk material and adding water to dissolve the oligosaccharides while leaving the lactose in a crystallised form.

10. The process as claimed in claim 7 wherein the deproteinised milk material is selected from the group consisting of a milk ultrafiltration permeate and a whey ultrafiltration permeate.

11. The process as claimed in claim 7 wherein the lactose removal step is repeated one or more times to further concentrate the liquor and eliminate lactose.

12. The process as claimed in claim 7 comprising treating the liquor product with individual proteases and/or combinations thereof to degrade any remaining milk proteins and peptides into entities with reduced molecular mass.

13. The process as claimed in claim 7 comprising treating the milk material with β-galactosidase to produce a whey material comprising β-galactosyl-oligosaccharides.

14. The process as claimed in claim 7 comprising treating the liquor product with β-galactosidase to produce a liquor comprising β-galactosyl-oligosaccharides.

15. The process as claimed in claim 13, wherein the β-galactosidase is derived from *Aspergillus oryzae*.

16. The process as claimed in claim 7 comprising spray-drying the liquor product to produce powder.

17. The oligosaccharide mixture as claimed in claim 1, wherein the mixture is derived from a deproteinised animal milk material.

18. The process as claimed in claim 7, wherein concentration of the deproteinised milk material is carried out at a temperature of 50° C. to 90° C.

* * * * *